United States Patent [19]

Rubin

[11] Patent Number: 4,820,502

[45] Date of Patent: Apr. 11, 1989

[54] SYNTHETIC CRYSTALLINE SILICATE

[75] Inventor: Mae K. Rubin, Bala Cynwyd, Pa.

[73] Assignee: Mobil Oil Corporation, New York, N.Y.

[21] Appl. No.: 117,859

[22] Filed: Nov. 6, 1987

Related U.S. Application Data

[63] Continuation-in-part of Ser. No. 17,288, Feb. 20, 1987, abandoned.

[51] Int. Cl.$^4$ ............................................. C01B 33/28
[52] U.S. Cl. ................................................... 423/328
[58] Field of Search ....................... 423/328, 329, 330; 502/64, 71, 73

[56] References Cited

U.S. PATENT DOCUMENTS

| | | | |
|---|---|---|---|
| 3,702,886 | 11/1972 | Argauer et al. | 423/328 |
| 3,720,753 | 3/1973 | Robson | 423/328 |
| 3,904,738 | 9/1975 | Robson | 423/329 |
| 4,209,499 | 6/1987 | Rubin et al. | 502/73 |
| 4,333,859 | 6/1982 | Vaughan et al. | 423/330 |
| 4,645,655 | 2/1987 | Whittam | 423/328 |

OTHER PUBLICATIONS

Rabo, J., "Zeolite Chemistry and Catalysis", ACS Monograph 171, pp. 615-616, 1976.
H. Annehed, L. Falth, Zeitschrift fur Kristallographie, 166, 301-306, (1984).
C. Hurlbut, The American Mineralogist, 42, 792-797, (1957).
C. Hurlbut et al., The American Mineralogist, 43, 768-769, (1958).
C. Hurlbut, The American Mineralogist, 47, 557-559, (1962).
P. Leavens et al., The American Mineralogist, 53, 1202-1207, (1968).
V. Kocman et al., The American Mineralogist, 59, 71-78, (1974).
D. J. Drysdale, The American Mineralogist, 56, 1718-1723, (1971).

Primary Examiner—John Doll
Assistant Examiner—R. Bruce Breneman
Attorney, Agent, or Firm—Alexander J. McKillop; Charles J. Speciale; Dennis P. Santini

[57] ABSTRACT

This invention relates to a synthetic crystalline bikitaite-type material, a method for its preparation and use thereof in catalytic conversion of organic compounds.

11 Claims, No Drawings

SYNTHETIC CRYSTALLINE SILICATE

CROSS-REFERENCE TO RELATED APPLICATION

This is a continuation-in-part of application Ser. No. 017,288, filed Feb. 20, 1987, now abandoned.

BACKGROUND OF THE INVENTION

1. Field of the Invention

This invention relates to a synthetic crystalline bikitaite-type material, to a method for its preparation and to its use in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to infinity. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicates or organosilicates of varying alumina and metal content. A cesium-containing aluminosilicate having a structure different from the present silicate and having a $SiO_2/Al_2O_3$ mole ratio of 10 was described in J. Am. Min. 61, 170-1 (1976) and T. Zeit. Krist. 152, 207-13 (1980).

Cesium-containing aluminosilicate isotypical with the framework of bikitaite is taught by Annehed and Falth in Zeitschrift fur Kristallographie, 166, 301-306 (1984). Their material has an elemental analysis of $Cs_{0.35}Al_{0.35}Si_{2.65}O_6$. Synthetic bikitaite containing lithium is taught by Drysdale, The American Mineralogist, 56, 1718-1723 (1971). Other references showing natural bikitaite and its properties include Hurlbut, The American Mineralogist, 42, 792-797 (1957); Id. at 43, 768-769 (1958); Id. at 47, 557-559 (1962); Leavens, Hurlbut and Nelen, The American Mineralogist, 53, 1202-1207 (1968); and Kocman, Gait and Rucklidge, The American Mineralogists, 59, 71-78 (1974).

SUMMARY OF THE INVENTION

The present invention is directed to a synthetic crystalline bikitaite-type silicate material, a method for its preparation, and the conversion of organic compounds contacted therewith.

The structure of the present silicate is distinguished from other crystalline silicates by a unique X-ray diffraction pattern. A typical X-ray diffraction pattern for this material is shown in Table 1, hereinafter.

The present crystalline silicate has a composition, on an anhydrous basis, involving oxides of cesium, silicon and aluminum, with or without sodium, in the relationship

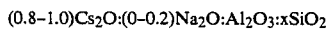

$(0.8-1.0)Cs_2O:(0-0.2)Na_2O:Al_2O_3:xSiO_2$ wherein x is at least about 17, usually from about 17 to about 100, more usually from about 17 to about 60.

DESCRIPTION OF SPECIFIC EMBODIMENTS

The original cations, eg. sodium, of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB and VIII of the Periodic Table of the Elements.

Typical ion exchange technique would be to contact the synthetic material with a salt of the desired replacing cation or cations. Examples of such salts include the halides, e.g. chlorides, nitrates and sulfates.

Crystals of the new synthetic crystalline silicate described and claimed herein have a typical X-ray diffraction pattern which distinguishes it from other crystalline materials. The intensities of that pattern are as follows:

TABLE 1

| Interplanar d-Spacing (A) | Relative Intensity, I/Io |
|---|---|
| 7.42 ± 0.2 | w |
| 6.72 ± 0.2 | w |
| 4.28 ± 0.1 | s-vs |
| 4.02 ± 0.1 | w |
| 3.68 ± 0.05 | w |
| 3.35 ± 0.05 | s-vs |
| 3.29 ± 0.05 | m-vs |
| 3.14 ± 0.05 | w-m |
| 2.946 ± 0.02 | w |
| 2.791 ± 0.02 | w |
| 2.716 ± 0.02 | w |
| 2.532 ± 0.02 | w-s |
| 2.381 ± 0.02 | w |
| 2.357 ± 0.02 | w |
| 2.182 ± 0.02 | w |
| 2.013 ± 0.02 | w |
| 1.946 ± 0.02 | w |
| 1.911 ± 0.02 | w |
| 1.843 ± 0.02 | w |
| 1.815 ± 0.02 | w |
| 1.688 ± 0.02 | w |
| 1.672 ± 0.02 | w |
| 1.640 ± 0.02 | w |
| 1.587 ± 0.02 | w |
| 1.565 ± 0.02 | w |

These X-ray diffraction data were collected with a Philips diffraction system, equipped with a graphite diffracted beam monochromator and scintillation counter, using copper K-alpha radiation. The diffraction data were recorded by step-scanning at 0.04 degrees of two-theta, where theta is the Bragg angle, and a counting time of 4 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60-100), s=strong (40-60), m=medium (20-40) and w=weak (0-20). It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline silicate of the present invention can be used either in the alkali metal form, e.g. the sodium form; the ammonium form; the hydrogen form or another univalent or multivalent cationic form. When used as a catalyst, the material may be subjected to thermal treatment. Since no organic directing agent need be used in synthesis of the present material, there will normally not be organic constituent to be removed from as-synthesized material.

The crystalline silicate can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition to the extent aluminum is in the structure, impregnated therein or intimately physically admixed therewith. Such component can be impregnated in or on to it such as, for example in the case of platinum, by treating the crystalline material with a solution containing a platinum metal containing ion. Thus, suitable platinum compounds include chloroplatinic acid, platinous chloride and various compounds containing the platinum amine complex.

The above crystalline silicate, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product is particularly useful in the catalysis of certain hydrocarbon conversion reactions.

The new silicate, when employed either as an adsorbent or as a catalyst in an organic compound conversion process should be dehydrated, at least partially. This can be done by heating to a temperature in the range of 200° C. to 595° C. in an inert atmosphere, such as air, nitrogen, etc. and at atmospheric, subatmospheric or superatmospheric pressures for between 30 minutes and 48 hours. Dehydration can also be performed at room temperature merely by placing the material in a vacuum, but a longer time is required to obtain a sufficient amount of dehydration.

The present crystalline bikitaite-type silicate can be synthesized from a reaction mixture containing sources of aluminum, silicon, cesium, water and, optionally, sodium, said reaction mixture having a composition, in terms of mole and atomic ratios within the following ranges:

| Reactants | Useful | Preferred |
|---|---|---|
| $SiO_2/Al_2O_3$ | 10-200 | 30-100 |
| $H_2O/SiO_2$ | 10-60 | 20-40 |
| $OH^-/SiO_2$ | 0.1-0.6 | 0.1-0.4 |
| $Cs/(Cs + Na)$ | 0.1-1 | 0.2-1 |

Crystallization of the bikitaite-type silicate can be carried out at either static or stirred condition in a suitable reactor vessel, such as for example, polypropylene jars or teflon lined or stainless steel autoclaves. The total useful range of temperatures for crystallization is from about 80° C. to about 225° C. for a time sufficient for crystallization to occur at the temperature used, e.g. from about 24 hours to about 60 days. Thereafter, the crystals are separated from the liquid and recovered. The reaction mixture can be prepared utilizing materials which supply the appropriate components. Such materials may include sodium and cesium silicate, silica hydrosol, silica gel, silicic acid, sodium and cesium hydroxide and a source of aluminum.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

In all cases, synthesis of the new silicate crystals is facilitated by the presence of at least 0.01 percent, preferably 0.10 percent and still more preferably 1 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In general, organic compounds such as, for example, hydrocarbons are converted to conversion products such as, for example, lower molecular weight hydrocarbons, over catalyst comprising the crystalline silicate hereof by contact under organic compound conversion conditions including a temperature of from about 100° C. to about 800° C., a pressure of from about 0.1 atmosphere (bar) to about 100 atmospheres, a weight hourly space velocity of from about 0.08 $hr^{-1}$ to about 20 $hr^{-1}$ and a hydrogen/feedstock organic, eg. hydrocarbon, compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20; and dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20.

In the case of many catalysts, it is desired to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e. combined therewith, which is active, tends to change the conversion and/or selectively of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clays binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples all percentages are by weight, and whenever sorption data are set forth for comparison of sorptive capacities for cyclohexane, water and/or hexane, they were determined as follows:

A weighed sample of the calcined adsorbant was contacted with the desired pure adsorbate vapor in an adsorption chamber, evacuated to less than 1 mm and contacted with 40 mm Hg of n-hexane or cyclohexane vapor, pressures less than the vapor-liquid equilibrium pressure of the respective adsorbate at 90° C. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$ ). The Alpha Test is described in U.S. Pat. No. 3,354,078 and in The Journal of Catalysis, Vol. IV, pp. 522–529 (August 1965), each incorporated herein as to that description. It is noted that intrinsic rate constants for many acid-catalyzed reactions are proportional to the Alpha Value for a particular crystalline silicate catalyst, i.e. the rates for toluene disproportionation, xylene isomerization, alkene conversion and methanol conversion (See "The Active Site of Acidic Aluminosilicate Catalysts," *Nature*, Vol. 309, No. 5969, pp. 589–591, June 14, 1984).

EXAMPLE 1

A solution of colloidal silica (30%) was added with vigorous stirring to a solution of 1.9 g sodium aluminate (43.3% $Al_2O_3$, 32.2% $Na_2O$, 25.8% $H_2O$) and 30.2 g 50% cesium hydroxide solution in 158 g $H_2O$. The molar and atomic ratios of the ingredients in the reaction mixture were:

$SiO_2/Al_2O_3 = 50$ $OH^-/SiO_2 = 0.33$ $H_2O/SiO_2 = 32$ $Cs^+/(Cs^+ + Na^+) = 0.85$

The reaction mixture was continuously stirred and maintained at 175° C. for 5 days. The product crystals were filtered from the mother liquor, washed with water and dried in air at 120° C. The crystals were then analyzed by X-ray diffraction and chemical analysis.

The X-ray data, proving the product of this example to be the new crystalline silicate with quartz impurity, is listed hereinafter in Table 2. The product proved to have a composition as follows:

$SiO_2 = 84.2$ wt. %

$Al_2O_3 = 4.2$ wt. %

$Na = 0.16$ wt. %

$Cs = 11.2$ wt %

$Ash = 98.7$ wt %

$SiO_2/Al_2O_3$, molar ratio = 34.1

TABLE 2

| d(A) | Relative Intensity |
| --- | --- |
| 7.9 | 9 |
| 6.7 | 7 |
| 4.25 | 100 |
| 4.12 | 12 |
| 3.96 | 16 |
| 3.64 | 7 |
| 3.34 | 100 |
| 3.26 | 63 |
| 3.12 | 26 |
| 2.91 | 12 |
| 2.795 | 7 |
| 2.52 | 41 |
| 2.003 | 5 |
| 1.909 | 7 |
| 1.848 | 7 |
| 1.815 | 7 |

Following calcination of the product of Example 1 at 538° C. for 3 hours, X-ray diffraction analysis resulted in the pattern detailed in Table 2A.

TABLE 2A

| d(A) | Relative Intensity |
| --- | --- |
| 7.88 | 5 |
| 6.59 | 8 |
| 4.21 | 80 |
| 4.07 | 10 |
| 3.95 | 11 |
| 3.63 | 12 |
| 3.31 | 100 |
| 3.24 | 52 |
| 3.10 | 7 |
| 2.90 | 13 |
| 2.759 | 3 |
| 2.673 | 2 |
| 2.510 | 24 |
| 2.365 | 6 |
| 2.162 | 4 |
| 1.997 | 4 |
| 1.930 | 3 |
| 1.896 | 7 |
| 1.846 | 3 |
| 1.828 | 7 |
| 1.802 | 10 |

EXAMPLE 2

A 0.225 g quantity of aluminum powder was dissolved in a solution of 9.44 g 50% cesium hydroxide solution and 65.0 g $H_2O$. This solution was added to 20.8 g colloidal silica (30%) and thoroughly mixed. This mixture was composed as follows:

$SiO_2/Al_2O_3 = 25$ $OH^-/SiO_2 = 0.33$ $H_2O/SiO_2 = 45.0$ $Cs^+/(Cs^+ + Na^+) = 1.0$

This reaction mixture was placed in a teflon-lined reactor and crystallized at 160° C. for 29 days. The crystal product was filtered from unreacted mixture components, washed with water, dried at 120° C. and submitted for X-ray and chemical analysis.

The X-ray diffraction data, proving the product of this example to be the new silicate with quartz impurity, is listed in Table 3 hereafter. The product had a composition as follows:

$SiO_2 = 69.1$ wt %

$Al_2O_3 = 6.6$ wt %

$Na = 1043$ ppm $Cs = 18.7$ wt %

$Ash = 100.0$ wt %

$SiO_2/Al_2O_3$, molar ratio = 17.8

TABLE 3

| d(A) | Relative Intensity |
| --- | --- |
| 8.07 | 1 |
| 4.27 | 60 |
| 4.00 | 11 |
| 3.66 | 11 |
| 3.43 | 22 |
| 3.35 | 100 |
| 3.28 | 54 |
| 3.13 | 11 |
| 2.923 | 15 |
| 2.788 | 4 |
| 2.700 | 2 |
| 2.527 | 31 |
| 2.418 | 6 |
| 2.354 | 7 |
| 2.214 | 5 |
| 2.182 | 5 |
| 2.012 | 6 |
| 1.909 | 8 |

TABLE 3-continued

| d(A) | Relative Intensity |
|---|---|
| 1.839 | 8 |
| 1.814 | 11 |

EXAMPLES 3-7

Five separate synthesis reaction mixtures were prepared with compositions indicated in Table 4. The mixtures were prepared with silica sol (30% $SiO_2$) as the source of silicon and 50% cesium hydroxide solution as the source of cesium. Aluminum powder was used as the source of aluminum in Example 5, with sodium aluminate used in Examples 3, 4, 6 and 7. Only Example 6 used a stirred reactor, the other examples were prepared under static conditions. Reaction temperature and time conditions for each example are also listed in Table 4.

X-ray diffraction analysis of the separated crystalline products from each of these examples proved them to be the new silicate with quartz impurity. Table 6 lists the X-ray data for Examples 3, 4 and 5 for illustration. Chemical analysis data for each product of these examples is presented in Table 5.

TABLE 4

| Example | Mixture Composition, Mole & Atomic Ratios | | | | Reaction Conditions | |
|---|---|---|---|---|---|---|
| | $SiO_2/Al_2O_3$ | $OH^-/SiO_2$ | $H_2O/SiO_2$ | $Cs^+/(Cs^+ + Na^+)$ | Temp, °C. | Time, Days |
| 3 | 30 | 0.25 | 31.5 | 0.67 | 150 | 48 |
| 4 | 30 | 0.25 | 40.0 | 0.67 | 175 | 22 |
| 5 | 49 | 0.20 | 27.0 | 1.0 | 160 | 85 |
| 6 | 50 | 0.30 | 32.0 | 0.84 | 162 | 10 |
| 7 | 70 | 0.20 | 30.0 | 0.82 | 160 | 38 |

TABLE 5

| Example | Product Compositions, Moles/Mole $Al_2O_3$ | | |
|---|---|---|---|
| | $Cs_2O$ | $Na_2O$ | $SiO_2$ |
| 3 | 1.25 | 0.10 | 23.5 |
| 4 | 0.93 | 0.10 | 23.1 |
| 5 | 1.07 | | 31.7 |
| 6 | 1.20 | 0.10 | 30.1 |
| 7 | 1.10 | 0.07 | 50.2 |

TABLE 6

| Example 3 | | Example 4 | | Example 5 | |
|---|---|---|---|---|---|
| d(A) | Rel. Intensity | d(A) | Rel. Intensity | d(A) | Rel. Intensity |
| 4.26 | 66 | 8.03 | 3 | 6.72 | 1 |
| 3.98 | 9 | 6.66 | 3 | 4.28 | 35 |
| 3.64 | 5 | 4.25 | 70 | 4.00 | 5 |
| 3.34 | 100 | 4.10 | 8 | 3.67 | 2 |
| 3.27 | 60 | 3.99 | 12 | 3.35 | 100 |
| 3.13 | 14 | 3.66 | 6 | 3.28 | 25 |
| 2.929 | 11 | 3.34 | 100 | 3.14 | 7 |
| 2.786 | 6 | 3.27 | 55 | 2.934 | 6 |
| 2.663 | 1 | 3.12 | 11 | 2.788 | 2 |
| 2.525 | 40 | 2.923 | 11 | 2.532 | 17 |
| 2.379 | 9 | 2.778 | 4 | 2.465 | 6 |
| 2.353 | 9 | 2.523 | 31 | 2.386 | 3 |
| 2.008 | 8 | 2.380 | 8 | 2.355 | 3 |
| 1.906 | 8 | 2.347 | 8 | 2.289 | 5 |
| 1.839 | 12 | 2.275 | 2 | 2.241 | 3 |
| 1.813 | 11 | 2.175 | 5 | 2.134 | 4 |
| | | 2.007 | 6 | 2.013 | 3 |
| | | 1.905 | 9 | 1.984 | 4 |
| | | 1.835 | 9 | 1.910 | 4 |
| | | 1.809 | 10 | 1.823 | 14 |

EXAMPLE 8

Samples of the Example 3 and 4 product crystals, having been calcined in air for 16 hours at 540° C., were subjected to the sorption test. The sorption results were as follows:

| Crystal From Example | Adsorption, Wt % | | |
|---|---|---|---|
| | Cyclohexane | n-Hexane | Water |
| 3 | 1.3 | 1.7 | 1.3 |
| 4 | 1.6 | 1.2 | 1.0 |

EXAMPLE 9

A portion of product silicate from Example 6 was exchanged with 10% $NH_4Cl$ solution, 10 cc/g solid. Five 1-hour contacts were conducted at 85° C. The resulting exchanged material was filtered, washed with water and dried at 120° C.

The cesium content of the exchanged product was 4.0 wt %. The sodium content was only 928 ppm.

EXAMPLE 10

The Example 9 product was evaluated in the Alpha Test. Its Alpha Value proved to be 2, twice that of silica-alumina cracking catalyst.

What is claimed is:

1. A synthetic crystalline material characterized by an X-ray diffraction pattern including the following values:

| Interplanar d-Spacing (Angstroms) | Relative Intensity |
|---|---|
| 7.42 ± 0.2 | w |
| 6.72 ± 0.2 | w |
| 4.28 ± 0.1 | s–vs |
| 4.02 ± 0.1 | w |
| 3.68 ± 0.05 | w |
| 3.35 ± 0.05 | s–vs |
| 3.29 ± 0.05 | m–vs |
| 3.14 ± 0.05 | w–m |
| 2.946 ± 0.02 | w |
| 2.791 ± 0.02 | w |
| 2.716 ± 0.02 | w |
| 2.532 ± 0.02 | w–s |
| 2.381 ± 0.02 | w |
| 2.357 ± 0.02 | w |
| 2.182 ± 0.02 | w |
| 2.013 ± 0.02 | w |
| 1.946 ± 0.02 | w |
| 1.911 ± 0.02 | w |
| 1.843 ± 0.02 | w |
| 1.815 ± 0.02 | w |
| 1.688 ± 0.02 | w |
| 1.672 ± 0.02 | w |
| 1.640 ± 0.02 | w |
| 1.587 ± 0.02 | w |
| 1.565 ± 0.02 | w | wherein w=weak, m=medium, s=strong and vs=very strong.

2. The crystalline material of claim 21 having a composition comprising oxides of silicon, aluminum and cesium in the relationship

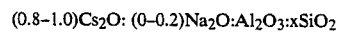
$(0.8-1.0)Cs_2O: (0-0.2)Na_2O:Al_2O_3:xSiO_2$ wherein x is at least about 10.

3. The crystalline material of claim 2 wherein x is from about 10 to about 100.

4. The crystalline material of claim 3 wherein x is from about 10 to about 60.

5. The crystalline material comprising the crystalline material of claim 2 having original cations replaced, at least in part, with a cation or a mixture of cations selected from the group consisting of hydrogen and hydrogen precursors, rare earth metals, and metals of Groups IIA, IIIA, IVA, IB, IIB, IIIB, IVB, VIB and VIII of the Periodic Table of the Elements.

6. The crystalline material comprising the crystalline material of claim 3 having original cations replaced, at least in part, with a cation or a mixture of cations selected from the group consisting of hydrogen and hydrogen precursors, rare earth metals, and metals of Groups IIA, IIIA, IVA, IB, IIB, IIIB, IVB, VIB and VIII of the Periodic Table of the Elements.

7. The crystalline material of claim 5 wherein said replacing cations comprise hydrogen or a hydrogen precursor.

8. The crystalline material of claim 5 wherein said replacing cations comprise metals.

9. A composition comprising (1) synthetic crystalline material characterized by an X-ray diffraction pattern including the following values:

| Interplanar d-Spacing (Angstroms) | Relative Intensity |
| --- | --- |
| 7.42 ± 0.2 | w |
| 6.72 ± 0.2 | w |
| 4.28 ± 0.1 | s-vs |
| 4.02 ± 0.1 | w |
| 3.68 ± 0.05 | w |
| 3.35 ± 0.05 | s-vs |
| 3.29 ± 0.05 | m-vs |
| 3.14 ± 0.05 | w-m |
| 2.946 ± 0.02 | w |
| 2.791 ± 0.02 | w |
| 2.716 ± 0.02 | w |
| 2.532 ± 0.02 | w-s |
| 2.381 ± 0.02 | w |
| 2.357 ± 0.02 | w |
| 2.182 ± 0.02 | w |
| 2.013 ± 0.02 | w |
| 1.946 ± 0.02 | w |
| 1.911 ± 0.02 | w |
| 1.843 ± 0.02 | w |
| 1.815 ± 0.02 | w |
| 1.688 ± 0.02 | w |
| 1.672 ± 0.02 | w |
| 1.640 ± 0.02 | w |
| 1.587 ± 0.02 | w |
| 1.565 ± 0.02 | w | wherein w=weak, m=medium, s=strong and vs=very strong, and (2) a matrix.

10. The composition of claim 9 wherein said matrix comprises silica.

11. The composition of claim 9 wherein said matrix comprises alumina.

* * * * *

UNITED STATES PATENT AND TRADEMARK OFFICE
CERTIFICATE OF CORRECTION

PATENT NO. : 4,820,502
DATED : April 11, 1989
INVENTOR(S) : M.K. Rubin

It is certified that error appears in the above-identified patent and that said Letters Patent is hereby corrected as shown below:

Col. 5, line 25  "0.08 hr$^{311}$" should be —0.08 hr$^{-1}$—

Col. 10, claim 2, line 60  "21" should be —1—

Signed and Sealed this

Twenty-third Day of January, 1990

*Attest:*

JEFFREY M. SAMUELS

*Attesting Officer*   *Acting Commissioner of Patents and Trademarks*